Dec. 25, 1962  O. H. BANKER  3,070,202
FLUID ACTUATED CLUTCH
Original Filed April 13, 1955

INVENTOR.
Oscar H. Banker
BY
Attorney

United States Patent Office 3,070,202
Patented Dec. 25, 1962

3,070,202
FLUID ACTUATED CLUTCH
Oscar H. Banker, Bay Village, Ohio, assignor, by mesne assignments, to Fawick Corporation, Cleveland, Ohio, a corporation of Michigan
Original application Apr. 13, 1955, Ser. No. 501,017. Divided and this application Mar. 10, 1961, Ser. No. 94,885
4 Claims. (Cl. 192—85)

This application is a division of my co-pending application Serial No. 501,017 filed April 13, 1955, now Patent No. 2,977,813, for Power Steering Mechanism.

This invention relates to fluid actuated clutches which are particularly well adapted for transmitting a drive from a drive pulley to an output shaft disposed concentrically with respect to said pulley. For purposes of illustration, this invention will be described with particular reference to its application as a means for supplying power from an engine fan belt to a mechanical type power steering mechanism.

An object of this invention is to provide a power unit for a power steering mechanism which derives its energy from a belt drive, with fluid operated clutch means adapted to engage and disengage the belt drive, and with solenoid operated valve means for controlling the operation of the clutch.

As a more specific object, this invention seeks to provide a power take-off unit powered by a belt drive and controlled by a hydraulically operated clutch, said unit being compact, rugged and bracket-mounted.

Figure 1:
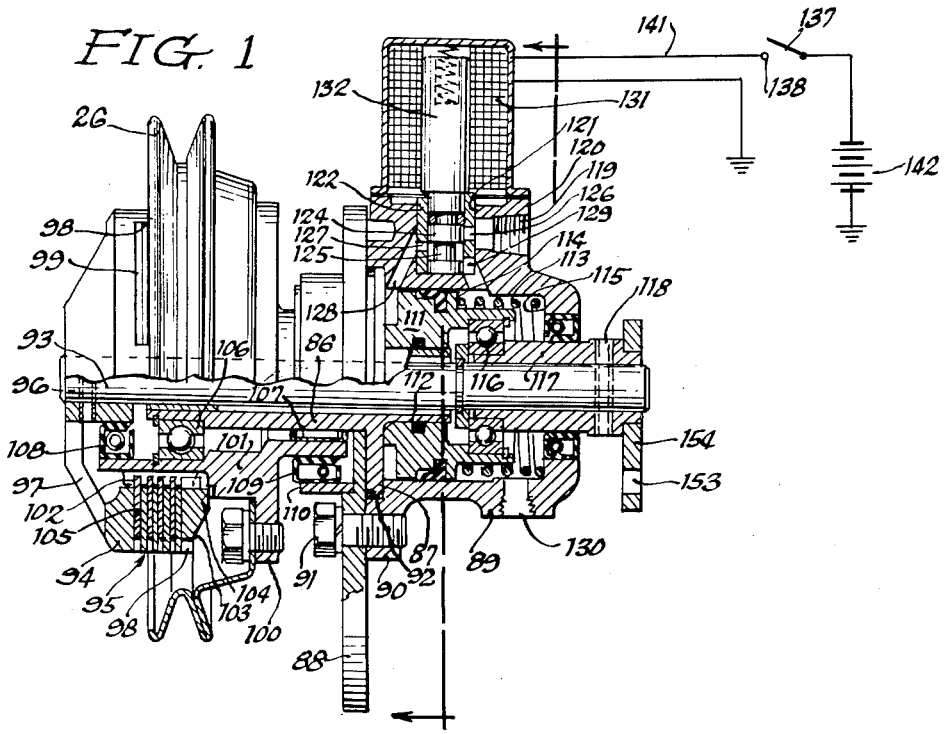
Figure 2:
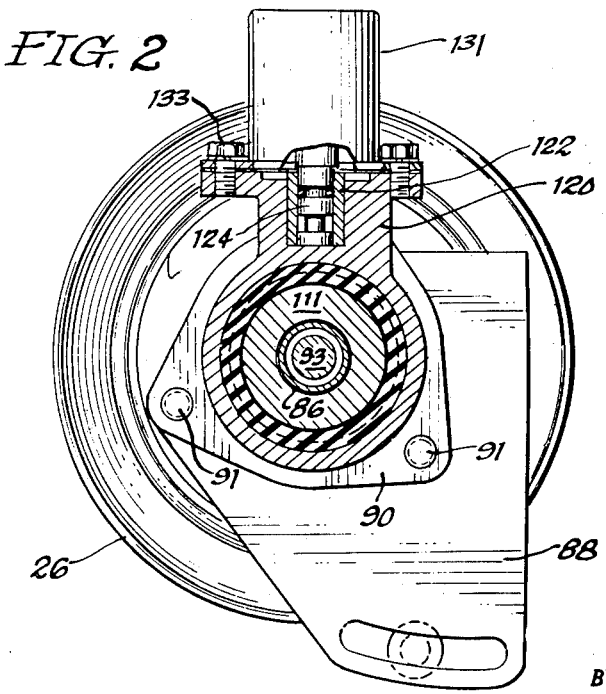

These and other objects of this invention will become apparent from the following detailed description when taken together with the accompanying drawings in which:

FIG. 1 is an elevation, partly in section, of the power unit showing particularly the means for controlling the application of fluid pressure to the clutch thereof; and FIG. 2 is an end elevation in section of the unit of FIG. 1.

Referring now to the drawings for a detailed description of the invention, there is shown an output drive element in the form of a coupling element 154 having an opening 153 therein, by which said coupling element can be bolted to a mating coupling element (not shown). The power for driving coupling element 154 is derived from a pulley 26 which is rotatably mounted on a sleeve 86 having a radially extending flange 87 near one end thereof by which the sleeve may be clamped to a bracket 88. The clamping means comprises a cylinder 89 having a flange 90 adapted to be secured to bracket 88 by a plurality of bolts 91. The outer periphery of flange 87 is received in a recess 92 of slightly less depth than the thickness of flange 87 so as to result in the desired clamping action of flange 87 against bracket 88 when bolts 91 are tightened.

Within sleeve 86 is mounted a shaft 93 to the left hand end of which, as viewed in FIG. 2, is fastened a belled driven housing 94 of a multiple plate dry friction clutch 95. The means for fixing housing 94 to shaft 93 may be a screw 96 of the Allen head type, access to which from the exterior of housing 94 may be had through a slot 97 formed in housing 94. Belled housing 94 has a plurality of notches 98 formed in the exterior surface thereof through which the driving ears 99 of the driven clutch plates may extend and by which the housing is driven from the clutch plates.

Pulley 26 is bolted to the flange 100 of the clutch driving hub 101 to which are splined the driving clutch plates 102. A reaction plate 103 of rigid form is provided for clutch 95, said reaction plate abutting on a shoulder 104 formed in clutch driving hub 101. A rigid clutch pressure plate 105 is formed on the interior of belled driven housing 94, preferably as an integral part thereof, and the driving and driven clutch plates are accordingly compressed between pressure plate 105 and reaction plate 103 when clutch 95 is engaged.

Hub 101 is supported from sleeve 86 by a ball bearing 106 at one end of the hub, and by a needle bearing 107 at the other end. A seal 108, inserted between hub 101 and belled driven housing 94, serves to prevent dust from entering between sleeve 86 and hub 101 and also prevents lubricant from escaping from the bearing and entering between the plates of clutch 95. A similar seal 109 performs the same functions at the other end of clutch driving hub 101, said seal being retained between the hub and a cylindrical extention 110 on bracket 88.

It may be observed from the description thus far given that clutch 95 may be engaged and disengaged by an appropriate axial movement of shaft 93. The means by which such movement is imparted to the shaft will now be described.

Within cylinder 89 is disposed an annular piston 111 which surrounds an extension 112 of sleeve 86. Piston 111 is continuously urged to the left, as viewed in FIG. 1, by a spring 113 compressed between a shoulder 114 on piston 111 and radially inwardly extending flange 115 on housing 89. Said piston 111 is connected by a ball bearing 116 to a sleeve 117 secured for rotation with shaft 93 by a pin 118. Ball bearing 116 is rigidly held against axial movement relative to piston 111 and sleeve 117 by appropriate shoulders formed in each of these members and by suitable removable snap rings construc'ed in a manner obvious to those skilled in the art. The rigid axial connection between piston 111 and sleeve 117 results in an axial movement of shaft 93 whenever piston 111 is moved axially. Piston 111 is sealed with respect to extension 112 and cylinder 89 by means likewise familiar to those skilled in the art.

Fluid for operating piston 111 may be derived from any suitable source, but I prefer to take advantage of the lubricating system for the engine which drives pulley 26, such system generally utilizing oil under pressure. Said pressurized oil is conducted from the lubricating system to an inlet opening 119 formed in a relatively large radially extending boss 120 preferably formed integrally with cylinder 89. Said opening 119 is intercepted by a vertical bore 121 (FIG. 1) into which is pressed a valve sleeve 122. Within valve sleeve 122 is axially reciprocable a cylindrical valve 124 having a peripheral groove 125 formed therein.

Valve sleeve 122 has an inlet port 126 in communication with inlet opening 119, an outlet port 127 in commmunication with a passageway 128 leading to the left-hand side of piston 111 (FIG. 1), a vent port 129 communicating with the interior of cylinder 89 disposed to the right of piston 111, and a return opening 130 connected with the crankcase of the engine.

It may be observed at this point that oil entering cylinder 89 from vent port 129 serves to lubricate bearing 116 and may then pass between shaft 93 and sleeve 86 to lubricate the bearing bushings therebetween and then pass outwardly between sleeve 86 and clutch driving hub 101 to lubricate bearings 106 and 107.

Valve 124 is reciprocated in valve sleeve 122 by the armature 132 of a solenoid 131 to which valve 124 may be rigidly secured. Solenoid 131 may be secured to boss 120 by suitable bolts 133 disposed in appropriate ears formed on the housing for the solenoid and also on boss 120, as shown more clearly in FIG. 2.

The operation of solenoid 131 may be controlled by a switch arm 137 which is adapted to close a circuit through a contact 138 from a battery 142 or other source of electrical energy, said contact being connected by a conductor 141 to one terminal of the winding for solenoid 131. The opposite terminal of the solenoid winding is connected to battery 142 either directly or through a common ground. Thus, whenever electrical contact is established between switch arm 137 and contact 138, solenoid 131 is energized, whereupon its armature 132 is pulled up and valve 124 is similarly moved upwardly in valve sleeve 122 as viewed in FIG. 1. This causes peripheral groove 125 to bridge ports 126 and 127, thereby admitting fluid under pressure to the left-hand side of piston 111 as viewed in FIG. 1. This fluid pressure causes piston 111 and its associated sleeve 117 and shaft 93 to move to the right, as viewed in FIG. 1, to compress the plates of clutch 95 and results in a drive being established from pulley 26 to shaft 93.

Breaking of the electrical contact between contact 138 and switch arm 137 causes solenoid 131 to be deenergized, and armature 132 will then move downwardly under the action of the spring usually provided in the solenoid for this purpose to cause valve 124 to assume the position shown in FIG. 1, wherein groove 125 connects port 127 to vent port 129, relieving the pressure behind piston 111 to the position shown in FIG. 1. The return movement of the piston will force the oil out of cylinder 89 ahead of piston 111 and out through vent port 129 into the space behind piston 111 to lubricate the moving parts of this portion of the mechanism as aforesaid.

The pulley driven clutch 95 and the control therefor constitute a convenient power unit. It may, if occasion requires, be used to drive various accessories of a motor vehicle when appropriate controls and additional power take-off connections are provided for the solenoid 131 and shaft 93, respectively.

It is understood that the foregoing description is merely illustrative of a preferred embodiment of the invention and that the scope of the invention therefore is not to be limited thereto, but is to be determined.

I claim:

1. A power unit comprising a frame having an opening therein, a sleeve passing through said opening and spaced from said shaft, a pulley rotatably mounted on said sleeve, clutch means for connecting the pulley to the shaft, said clutch means including a plurality of dry alternately disposed driving and driven clutch plates, means for effecting a fluid tight seal between the shaft and the pulley and forming a chamber between the shaft and pulley, additional seal means for effecting a seal between the pulley and the frame and forming a chamber which is a continuation of the first-mentioned chamber and which extends between the sleeve and the pulley member, antifriction means in said extension of the chamber and supporting the pulley from the sleeve, a hydraulic motor for shifting the shaft axially, and a valve for applying fluid under pressure to the hydraulic motor, said valve being shiftable to a position to vent said fluid pressure means, said vented fluid being adapted to pass into the chamber between the shaft and sleeve and thence into the extension of said chamber to lubricate the antifriction means supporting the pulley on the sleeve.

2. A power unit as described in claim 1, said hydraulic motor comprising a cylinder secured to the frame and surrounding said shaft, an extension of the sleeve in said cylinder, an annular piston disposed on said extension of the sleeve, antifriction means adapted to transmit the axial thrust of the piston to the shaft but permitting relative rotation of the shaft within the piston, a valve, a source of fluid under pressure conneced to said valve and adapted to be applied to the piston through said valve, and means for operating said valve to apply said pressure to said piston or to vent pressure from said piston, said cylinder having an opening connecting the valve to the side of the piston opposite the side to which fluid under pressure is applied, said vented fluid passing through said opening in the cylinder to the antifriction means supporting the piston from the shaft and thence to the chamber and to the extension of the chamber as aforesaid.

3. A power unit comprising an apertured bracket for attachment to a motor or the like, a flanged sleeve extending through the aperture in the bracket with the said flange of the sleeve overlying the bracket, a housing secured to one side of said bracket, said housing having a shoulder bearing against the flange to clamp said flange against said bracket to prevent relative rotation therebetween, said housing flange and a portion of said sleeve forming between them an annular cylinder, an annular piston reciprocable in said cylinder, a rotatable and axially shiftable shaft in said sleeve, an antifriction connection between the piston and shaft, said connection preventing relative axial movement between the piston and shaft, valve means for admitting fluid under pressure into the annular cylinder, a clutch having a driven element connected to the shaft for axial movement therewith and an axially fixed driving element mounted for rotation on said sleeve, and means for driving said clutch driving element.

4. A power unit comprising an apertured bracket for attachment to a motor or the like, a flanged sleeve extending through the aperture in the bracket with the said flange of the sleeve overlying the bracket, a housing secured to one side of said bracket, said housing having a shoulder bearing against the flange to clamp said flange against said bracket to prevent relative rotation therebetween, said housing, flange and a portion of said sleeve forming between them an annular cylinder, an annular piston reciprocable in said cylinder, a rotatable and axially shiftable shaft extending through said sleeve, an anti-friction connection between the piston and shaft, said connection preventing relative axial movement between the piston and shaft, valve means on said housing for admitting fluid under pressure into the annular cylinder, a clutch having a driven element connected to the shaft for axial movement therewith, and an axially fixed driving element mounted for rotation on said sleeve, means on one side of the bracket for driving said clutch driving element, and means on the other side of said bracket for connecting said shaft to a load.

References Cited in the file of this patent

UNITED STATES PATENTS

| 2,388,857 | Lindsley | Nov. 13, 1945 |
| 2,498,123 | Hobbs | Feb. 21, 1950 |

FOREIGN PATENTS

| 61,230 | Denmark | Aug. 16, 1943 |
| 213,165 | Austria | Jan. 25, 1961 |